C. F. BRADBURN.
TELEPHONE SYSTEM.
APPLICATION FILED JAN. 20, 1908.

918,955.

Patented Apr. 20, 1909.
2 SHEETS—SHEET 1.

Witnesses.

Inventor.

UNITED STATES PATENT OFFICE.

CHARLES FRANKLIN BRADBURN, OF DELMER, ONTARIO, CANADA.

TELEPHONE SYSTEM.

No. 918,955.  Specification of Letters Patent.  Patented April 20, 1909.

Application filed January 20, 1908. Serial No. 411,730.

*To all whom it may concern:*

Be it known that I, CHARLES FRANKLIN BRADBURN, of Delmer, in the county of Oxford and Province of Ontario, Canada, have invented certain new and useful Improvements in Telephone Systems; and I hereby declare that the following is a full, clear, and exact description of the same.

In my concurrent application #387,949, for improvements in telephone apparatus, I have shown and described what may be termed a bi-circuit telephone system, in which the telephonic communication is established between telephone instruments by means of a selecting apparatus. Each selecting apparatus may be described as consisting of a primary mechanism and a secondary mechanism connected by a selecting circuit, the selecting circuit being normally without current and supplied by a selecting circuit battery brought into the circuit by the movement of part of the primary mechanism. The primary mechanism may be generally described as consisting of a primary dial having a series of contact plates and a primary pointer revoluble on the primary dial to successively engage the contact plates.

The present invention relates to a positioning mechanism for moving the primary pointer on the primary dial and a series of adjustable stops positioned opposite their respective contact plates and capable of being set to arrest the revolution of the primary pointer at any selected part of the dial.

Figure 1:
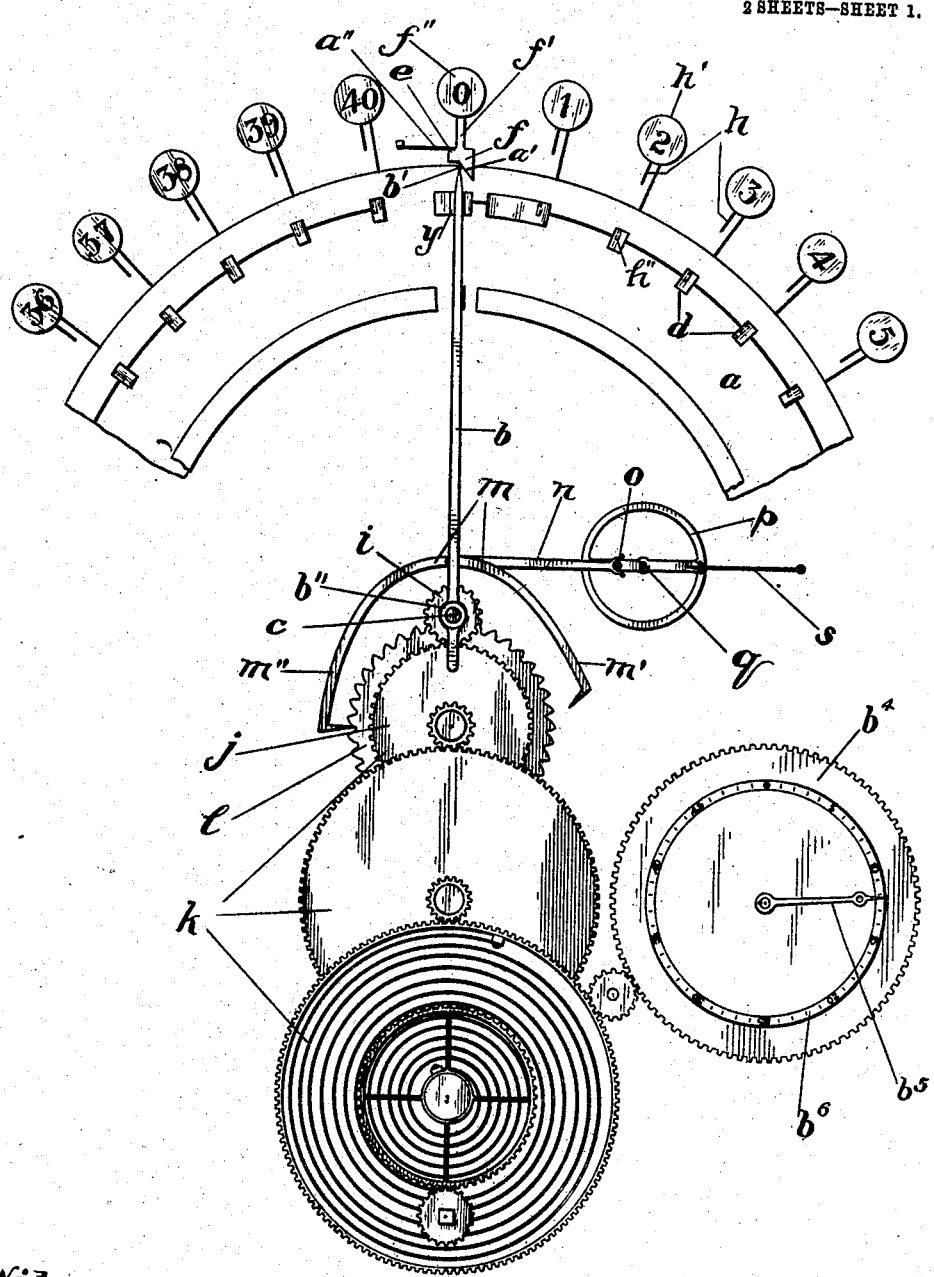
Figure 2:
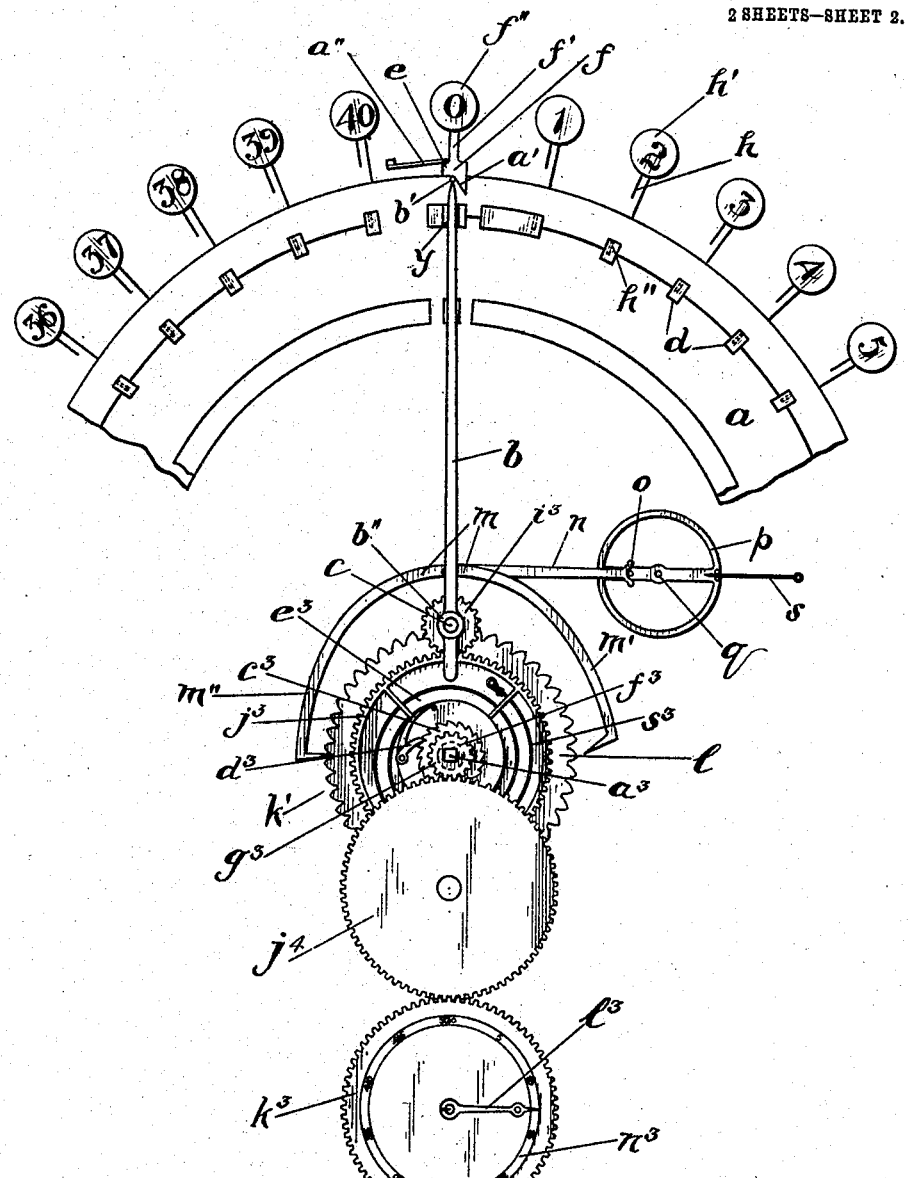

For an understanding of the invention reference is to be had to the following description and to the accompanying drawings in which;

Figures 1 and 2 are plan views of the same part of the primary mechanism of a selecting apparatus showing two modifications of the automatic positioner.

The primary dial $a$ is provided with a primary pointer $b$ and a series of contact plates $d$. The primary pointer $b$ carries a spring contact shoe $y$ arranged to engage with the contact plates $d$, and the hub $b''$ of the primary pointer $b$, revolves on the stud $c$ centrally located on the dial. The contact plates $d$ are radially arranged with the stud $c$ and the initial contact plate is generally termed zero. Opposite the zero contact plate is a zero stop $f$ normally in the path of the primary pointer $b$. The zero stop $f$ is formed with a beveled face $a'$ to engage with a projection or pin $b'$ carried by the primary pointer $b$, and arrest the movement of the primary pointer when it returns to the zero contact plate during its revolution around the dial. The zero stop $f$, is provided with a shank $f'$ having a handle or thumb piece $f''$ by which it can be lifted out of the path of the primary pointer to permit of the movement of the primary pointer from the zero contact plate. The zero stop $f$ is formed with a shoulder $e$ against which bears a spring $a''$ to return the zero stop to its initial position when relieved of the force employed to move it from the path of the primary pointer.

The initial position of the zero stop $f$ is that shown in the drawing and the purpose of the beveled face $a'$ is to slidably engage the end of the primary pointer and move that latter back to its correct zero position, should the primary pointer, during its revolution have swung partly past its correct zero position. To reduce the distance of the travel of the primary pointer from the zero contact plate to the contact plate opposite the place numbered 1, the latter contact plate is elongated in the direction of the zero contact plate to enable the primary pointer when it has moved from the zero contact plate to quickly close the relay actuating battery through the first numbered contact plate to the selecting circuit as described in the above named application. The primary dial is provided with an arresting stop $h$, at each of the numbered contact plates and the arresting stops $h$ are normally positioned clear of the path of the primary pointer but are adapted to be pressed into its path to arrest its movement at any selected contact plate. Each of the arresting stops $h$ is of conducting material and is provided with a hand grip or thumb piece $h'$ insulated therefrom and each contact plate is formed with a slot $h''$ to receive its respective arresting stop $h$. The hub $b''$ of the primary pointer is formed with a pinion $i$ which meshes with the spur wheel $j$ of the spring driven clock work mechanism $k$. The spur wheel $j$ is provided with a scape wheel $l$ with which engage the pallets $m$ pivotally connected with the primary dial $a$. The pallets $m$ are operated by an escapement lever $n$, rigidly attached to them near their pivot point, and the escapement lever $n$ is actuated by a pin $o$ carried by the balance wheel $p$, mounted on a stud $q$ on the primary dial $a$. The teeth of the scape wheel $l$ during the rotation of the latter, impel the pallet arm $m'$ in one direction, bringing the pallet arm $m''$ into engagement with them, and causing the escapement lever to swing the balance wheel in one direction. When the impelling movement of the escapement lever is completed, the balance wheel swings in the opposite direction under the influence of its spring $s$ and moves the escapement lever $n$ to release the pallet arm $m''$ from engagement with the teeth of the scape wheel so that the latter can rotate until the pallet arm $m'$ again comes into contact with a scape tooth, and so on, alternately.

By means of the escapement mechanism, the motion of the primary pointer is controlled during its revolution on the dial. By means of the clock work mechanism the primary pointer is caused to automatically revolve until it comes into engagement with the positioned arresting stop, so that the spring contact shoe $y$ carried by the primary pointer $b$ will engage the contact plate $d$ at that position. In the operation of the device the selected arresting stop is set, and the zero stop is released. During the releasing of the zero stop owing to the beveled face $a'$ thereof, the clock work mechanism $k$ is enabled to start the motion of the primary pointer before the zero stop is completely withdrawn from the path of the primary pointer so that the latter can quickly engage the first numbered contact plate when the zero stop is clear of the primary pointer's path. When the zero stop has been completely withdrawn from the path of the primary pointer, the clock work mechanism continues the movement of the primary pointer until the latter comes into engagement with the arresting stop $h$ which has been positioned to stop the movement of the primary pointer, the escapement mechanism controlling the speed of the movement of the primary pointer during the rotation of the latter.

Mounted on the primary dial $a$ is an indicator $b^4$ having an indicator dial $b^6$, and an indicating pointer $b^5$, the latter being operated from the clock work mechanism $k$ hereinbefore described. If the main spring of the clock work mechanism will revolve the primary pointer $b$ around the primary dial $a$ only fifty times without having to be rewound, then the indicator dial $b^6$ is numbered around its periphery, from 0 to 50, so that when the said main spring is completely wound the indicator pointer $b^5$ will indicate the number 50 on the indicator dial $b^6$, and when the said main spring is in its unwound position, the indicator pointer $b^5$ will indicate the number 0 on the indicator dial $b^6$. When at any other position between 0 and 50 the indicator pointer $b^5$ will indicate the amount that the main spring of the clock work mechanism is unwound.

In the modified form of the positioning mechanism shown in Fig. 2, the winding axle $a^3$ for the clock work mechanism $k'$ has its outer end adapted to receive a key or winding lever, and extends from the primary dial $a$, and carries the winding drum $f^3$ for the main spring $s^3$. Mounted on the winding axle $a^3$ is a ratchet wheel $c^3$ engaged by a spring actuated detent $d^3$ carried by a disk $e^3$ rigidly attached to the spur wheel $j^3$, the disk $e^3$ and spur wheel $j^3$ being revoluble on the winding axle $a^3$. The main spring $s^3$ is attached at one end to the primary dial $a$, and to the winding drum $f^3$ at its other end, and is manually wound on the winding drum $f^3$ by rotating the winding axle $a^3$, the disk $e^3$ and spur wheel $j^3$ remaining stationary during the operation. When the zero stop $f$ is moved to release the primary pointer, the main spring $s^3$ causes the winding drum $f^3$, winding axle $a^3$, and ratchet wheel $c^3$ to revolve in the unwinding direction of the spring, and since the detent $d^3$ engages the teeth on the ratchet wheel $c^3$, it also causes the coincident movement of the disk $e^3$ and spur wheel $j^3$ in the same direction. Since the spur wheel $j^3$ meshes with the pinion $i^3$ carried by the hub of the primary pointer, the revolution of the spur wheel $j^3$ in the last named direction, causes the coincident revolution of the primary pointer in a forward direction. The winding axle $a^3$ carries a pinion $g^3$ which through the medium of a gear wheel $j^4$, operates a gear wheel $k^3$ carrying the indicator pointer $l^3$ so that any movement of the winding axle $a^3$ causes a coincident movement of the indicator pointer $l^3$ around the indicator dial $n^3$, the position of the indicator pointer indicating the condition of the main springs $s^3$— i. e.,—whether the main spring is fully wound or unwound or any intermediate state between them. The speed of the clock work mechanism $k'$ is controlled as hereinbefore described, the scape wheel $l$ being carried by the winding axle $a^3$.

Having thus fully described my invention what I claim as new and desire to secure by Letters Patent is:—

1. In a telephone system, a selecting apparatus consisting of a primary dial having a series of contact plates, a primary pointer revoluble on the primary dial, a detent stop removably connected to the primary dial to engage the primary pointer and arrest it at its initial position, and an arresting stop for each contact plate adapted to be set in the path of the primary pointer.

2. In a telephone system, a selecting apparatus consisting of a primary dial having a series of contact plates, a primary pointer revoluble on the primary dial, a detent stop removably connected to the primary dial to engage the primary pointer and arrest it at its initial position, an arresting stop for each contact plate adapted to be set in the path of the primary pointer, and a motor means for causing the revolution of the primary pointer.

3. In a telephone system, a selecting apparatus consisting of a primary dial having a series of contact plates, a primary pointer revoluble on the primary dial, a detent stop removably connected to the primary dial to engage the primary pointer and arrest it at its initial position, an arresting stop for each contact plate adapted to be set in the path of the primary pointer, a motor means for causing the revolution of the primary pointer, and a controlling means to govern the speed of the motor means.

4. In a telephone system, a selecting apparatus consisting of a primary dial having a series of contact plates arranged in an annular formation, one of which is employed as the initial contact plate, a primary pointer revoluble on the primary dial and arranged to successively engage the contact plates, a detent stop to hold the primary pointer at its initial position and normally set in the path of the primary pointer, and an arresting stop for each of the other contact plates normally clear of the path of the primary pointer and adapted to be set in the path of the latter.

5. In a telephone system, a selecting apparatus consisting of a primary dial having a series of contact plates arranged in an annular formation one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, and an actuating spring to return the detent stop to hold it in its operative position.

6. In a telephone system, a selecting apparatus consisting of a primary dial having a series of contact plates arranged in an annular formation, one of which is arranged as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, the detent stop having an inclined face to engage with the free end of the primary pointer.

7. In a telephone system, a selecting apparatus consisting of a primary dial having a series of contact plates arranged in an annular formation one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, and a motor means for causing the revolution of the primary pointer on the primary dial.

8. In a telephone system, a selecting apparatus, consisting of a primary dial having a series of contact plates arranged in an annular formation one of which is employed as the initial contact plate, a primary pointer revoluble in the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, and a motor means for causing the revolution of the primary pointer on the primary dial.

9. In a telephone system, a selecting apparatus consisting of a primary dial having a series of contact plates arranged in an annular formation, one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, the detent stop having an inclined face to engage with the free end of the primary pointer, and a motor means for causing the revolution of the primary pointer on the primary dial.

10. In a telephone system, a selecting apparatus, consisting of a primary dial having a series of contact plates arranged in an annular formation one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, a motor means for causing the revolution of the primary pointer on the primary dial, said motor means consisting of a pinion for the hub of the primary pointer, a spur wheel engaging the pinion and a clock work mechanism causing the revolution of the spur wheel.

11. In a telephone system a selecting apparatus consisting of a primary dial having a series of contact plates arranged in an annular formation one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, a motor means for causing the revolution of the primary pointer on the primary dial, said motor means consisting of a pinion for the hub of the primary pointer a spur wheel engaging the pinion, a clock work mechanism causing the revolution of the spur wheel, and a controlling means for governing the speed of the motor means.

12. In a telephone system a selecting apparatus consisting of a primary dial having a series of contact plates arranged in an annular formation one of which is employed as the initial contact plate, a primary pointer revoluble on the primary dial and arranged to successively engage the contact plates, a detent stop to hold the primary pointer at its initial position and normally set in the path of the primary pointer, an arresting stop for each of the other contact plates normally clear of the path of the primary pointer and adapted to be set in the path of the latter, an actuating spring to return the detent stop and to hold it in its operative position, a motor means for causing the revolution of the primary pointer on the primary dial, said motor means consisting of a pinion for the hub of the primary pointer, a spur wheel engaging the pinion, a clock work mechanism causing the revolution of the spur wheel, a controlling means for governing the speed of the motor means, said controlling means consisting of a scape wheel for the spur wheel, pallets co-acting with the scape wheel, an escapement lever for the pallets, and a balance wheel operated by the escapement lever to alternately bring the pallets into and out of engagement with the teeth of the scape wheel.

Delmer, Ontario, December 26th, 1907.

CHARLES FRANKLIN BRADBURN.

Signed in the presence of—
JOHN WIXON HILBORN,
MARY HORNE.